United States Patent Office 3,600,391
Patented Aug. 17, 1971

3,600,391
N-[DIBENZO (b,f)AZEPIN-10-YL]-PIPERAZINE
COMPOUNDS
Michele Mastursi, Naples, Sabino Lembo, Pozzuoli, and
Rene Viterbo, Naples, Italy, assignors to Richardson-
Merrell S.p.A., Naples, Italy
No Drawing. Filed Mar. 25, 1968, Ser. No. 715,535
Claims priority, application Italy, Mar. 28, 1967,
35,729/67
Int. Cl. C07d 51/70
U.S. Cl. 260—268                                    5 Claims

ABSTRACT OF THE DISCLOSURE

New compounds having the following general formula:

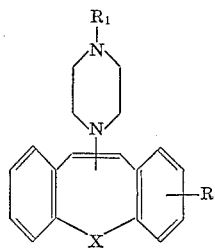

in which X is =O, =S, or =N—$R_2$; and R, $R_1$, and $R_2$ are a variety of substituents. The compounds have useful pharmacological activities which include hypertensive, sedative, muscle relaxant, local anesthetic, analgesic, anti-pyretic, and anti-inflammatory activities. Various salts of these compounds are also useful and are included within the scope of the present invention. Processes of preparing these compounds are described.

---

This invention relates to new and useful en-amines characterized by having the following general formula:

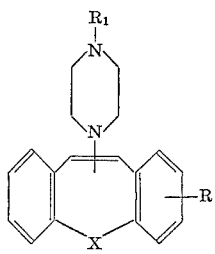

in which X is =O, =S, or =N—$R_2$; R is hydrogen, halogen, lower alkoxy, lower alkyl, amino, nitro, monoalkylamino, dialkylamino, trifluoromethyl, sulfonyl, or sulfonylamide; $R_1$ is hydrogen, lower alkyl, phenyl, benzyl benzoyl, carbalkoxy, carbalkoxyalkyl, phenacyl, alkylacetamide, dialkylacetamide, alkylcarboxamide, phenylcarboxamide, halophenylcarboxamide, phenylthiocarboxamide, cyanoethyl, picolyl, dialkylaminoalkyl, cyclopropylmethyl, allyl, or propargyl, and many other groups; and $R_2$ is hydrogen, lower alkyl, acyl, aryl, and aralkyl.

The acid addition salts of these new compounds as well as the oxonium, sulfonium, and ammonium salts and the sulfoxides and sulfones of those having a sulfur atom are included within the scope of the present invention.

En-amines are peculiar compounds and are therefore considered as a separate class of nitrogen-containing compounds and not as simple amine derivatives. Detailed reviews are devoted to en-amines (see for instance Szmuszkowicz, J., Enamines, pages 1 to 110 in: Raphael, R. A., Taylor, E. C., and Wynberg, H., Advances in Organic Chemistry: Methods and Results, Volume 4, Interscience Publishers, New York (1963)) in which structure as well as reactivity of these compounds are described.

En-amines such as those of the present invention easily undergo hydrolytic cleavage in acidic medium resulting in formation of a keto compound and the split-off amine grouping. However, some of these ketones are devoid of pharmacological activity from which it would appear that the compounds are not metabolized in vivo to the ketone but are transformed in some other way. Another peculiar property of en-amines is the ease with which they can be alkylated or acylated. Such alkylation and acylation could be a preliminary step in the metabolic fate of the compounds of the present invention.

The new compounds of the present invention are useful primarily because of their pharmacological activities which include anti-hypertensive, sedative, muscle relaxant, local anesthetic, analgesic, anti-pyretic, and anti-inflammatory activities as will be more specifically pointed out below.

The most pertinent prior art known to applicants is the publication by W. Tochtermann et al., Ber. 97, 1318 (1964). The Tochtermann et al. publication describes the synthesis of piperidide but not piperazine derivatives, however. Belgian Pat. 678,483 issued recently to Rhone-Poulenc on dibenzocycloheptatriene derivatives describes certain en-amines which, however, are carbocyclic and do not have oxygen, sulfur, or nitrogen atoms as represented by X in the formula above. It is obvious from theoretical considerations as well as observed pharmacological properties that the presence of a hetero atom in the three ring structure changes the geometric shape of the molecule and the reactivity of the same. It is also known that oxygen, sulfur, and nitrogen atoms can form oxonium, sulfonium, ammonium, and other salts and may be expected to be pharmacologically different in their activities from those compounds having no hetero atoms.

The new compounds of the present invention may be prepared by the method of Tochtermann et al. (Method A) or by treating the desired 10-keto derivative with a desired piperazine in a water non-miscible aprotic solvent or in an excess of the organic cyclic nitrogen base (Method B). In addition, the piperazine derivatives may by alkylated, arylated, or acylated to form further derivatives (Method C).

More particularly, Method A is carried out as follows: To a solution of potassium tertiary butylate prepared in-situ from potassium and anhydrous tertiary butyl alcohol or the equivalent amount of a suitable base, such as sodium amide, potassium or sodium alcoholate or a tertiary organic base, such as triethylamine, alkylpiperidine or a base of the anionic ion exchange type dissolved or suspended in a sufficient amount of anhydrous ethyl ether or other non-polar solvent, such as dioxane, aromatic, alicyclic or aliphatic hydrocarbon, such as benzene, toluene, cyclohexane, hexane or pentane, is added a solution in a non-polar solvent of the desired unsaturated halogen derivative (chloro or bromo derivative) of the formula:

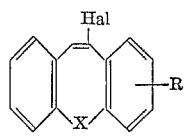

To this solution is added the solution of a desired piperazine base dissolved in the suitable non-polar anhydrous solvent, such as ethyl ether, dioxane, aromatic, alicyclic or aliphatic hydrocarbon.

The molar ratio between the base, halogen derivative, and piperazine base can be considerably varied depending on the reactivity of the various compounds involved in the reaction, as can be seen from the examples. The above mixture is allowed to react at a temperature between room temperature and boiling point of the solvent in a period of time between 3 and 24 hours. The reaction mixture is then partitioned in the usual manner between water and a water-immiscible organic solvent, such as ethyl ether, toluene, benzene, or ethyl acetate, chloroform or other. The organic layer is evaporated and the residue is crystallized from a suitable solvent, such as ethyl acetate, ethanol, methanol, or other, yielding the pure reaction product.

The process of Method B is carried out as follows: An enolizable keto derivative of the formula:

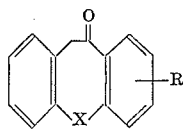

together with the piperazine base is dissolved in a suitable amount of anhydrous benzene or toluene or other, with water non-miscible, aprotic solvent or in an excess of the piperazine base and refluxed with the simultaneous elimination of the water formed during the reaction for a period of time between 24 and 100 hours in the presence of a Lewis acid such as p-toluenesulfonic acid, or the salt of a strong mineral acid with a weak organic base such as piperazine hydrochloride or other. After the end of the reaction, the solution is partitioned between water and a water insoluble solvent, such as ethyl ether, ethyl acetate, benzene, toluene, chloroform, or other. The organic phase is concentrated and the residue is crystallized from a suitable solvent, such as methanol, ethanol, ethyl acetate or other yielding the pure crystalline compound.

Further derivatives are prepared by Method C as follows: To the N-substituted piperazine derivative, wherein $R_1$ is hydrogen, prepared as described above dissolved in an anhydrous aprotic solvent, such as benzene, toluene, or other aromatic or aliphatic hydrocarbon or ethyl ether, is added the alkylating, arylating, or acylating agent if necessary in the presence of a suitable base, such as anhydrous sodium carbonate or bicarbonate, or other basic alkali metal salt or alcoholate or organic tertiary nitrogen base, such as pyridine, alkylpiperidine, triethylamine or anionic ion exchange resin. The reaction temperature can be chosen in the range from 0° C. to boiling temperature of the solvent and the reaction time is between 1 hour and 24 hours, depending on the reactivity of the compounds involved in the reaction. The reaction mixture is extracted with a water non-miscible solvent, such as ethyl ether, ethyl acetate, benzene, toluene, chloroform or other. The organic layer is concentrated and the residue crystallized from a suitable solvent, such as benzene, methanol, or ethylacetate.

The invention will now be illustrated by examples showing the preparation of a number of the compounds of the present invention by means of the several methods mentioned above.

EXAMPLE I

N-[dibenzo(b,f)oxepin-10-yl]-N'-methylpiperazine 29 grams (138 mmol) dibenzo(b,f)oxepin-10(11H)-one,[1]
29 grams (290 mmol) N-methylpiperazine, and
0.5 gram p-toluenesulfonic acid monohydrate were dissolved in 100 milliliters of anhydrous toluene.

The solution was refluxed for 71 hours, and the formed water was separated with a Dean-Stark trap. The solution was cooled and partitioned between toluene and water. The organic layer was washed with water until neutral, dried over anhydrous $Na_2SO_4$, and distilled under vacuum (water jet pump). The solid brown residue (46.6 grams) was crystallized from petroleum ether 60 to 80° C. and had a melting point of 111 to 112° C.

U.V. in ethanol 95%
λmax.=312 mμ; ε=10,600

To a solution of 4 grams of maleic acid dissolved in 30 milliliters of boiling ethanol is added a solution of 10 grams of N-[dibenzo(b,f)oxepin-10-yl]-N'-methylpiperazine in 50 milliliters of boiling ethanol. The hot solution was filtered and slowly added to 350 cc. anhydrous ethyl ether and kept at 4° C. for 4 hours. The filtered precipitate was washed four times with 10 milliliters anhydrous ether and dried at room temperature at a pressure of 0.01 mm. Hg. The obtained maleate acid addition salt in the form of white crystals had a melting point of 195 to 196° C. Yield: 13.2 grams.

U.V. in ethanol 95%
λmax.=308 mμ; ε=10,300

This compound exhibited muscle relaxing, hypotensive activity, and reduced spontaneous motility in mice by the method of Dews as illustrated in the tables which follow the specific examples. Similarly, the pharmacological activities of various other compounds of the specific examples are shown in these tables.

EXAMPLE II

N-[8-chloro-dibenzo(b,f)oxepin-10-yl]-N'-methylpiperazine 17.5 grams 8-chloro-dibenzo(b,f)oxepin-10(11H)-one (71.5 mmol) [2],
18 grams N-methylpiperazine (180 mmol), and
2.5 grams p-toluenesulfonic acid monohydrate were dissolved in 100 milliliters of anhydrous toluene.

The solution was refluxed for 73 hours, separating off the water with a Dean-Stark trap. The cooled solution was partitioned between toluene and water. The organic phase was washed with water until neutral, dried over anhydrous $Na_2SO_4$, and distilled under reduced pressure. The residue was crystallized from ethyl acetate yielding 9 grams of white crystals with a melting point of 125 to 128° C.

U.V. in ethanol 95%
λmax.=318 mμ; ε=9,000

The above-described compound (8.2 grams) was dissolved in 20 milliliters of boiling ethanol, and 2.9 grams of maleic acid dissolved in 10 milliliters of boiling ethanol were added. Ethyl ether was added to the solution until incipient crystallization (about 300 milliliters). The mixture was kept at 4° C. for four hours and then filtered. The residue was washed four times with 10 milliliters of anhydrous ethyl ether and dried under high vacuum, yielding 7.7 grams of white crystals of the maleate addition salt with a melting point of 184 to 187° C. (decomposition).

U.V. in ethanol 95%
λmax.=301 mμ; ε=8,960

EXAMPLE III

N-[8-methoxy-dibenzo(b.f)oxepin-10-yl]-N'-methylpiperazine 10.4 grams (43 mmol) 8-methoxy-dibenzo(b,f)oxepin-10(11H)-one,
10.5 grams (105 mmol) N-methylpiperazine, and
1.2 grams p-toluenesulfonic acid monohydrate were dissolved in 100 milliliters of anhydrous toluene The solution was refluxed for 72 hours, separating the formed water with a Dean-Stark trap. The cooled solution was partitioned between toluene and water. The organic phase was washed with water until neutral, and

---

[1] Known compound: See Shoshichino Kinroto et al. J. Pharm. Soc. Japan 74, 426 (1954) C.A. 49, 5374b (1955).

[2] Known compound: See J. R. Geigy A.-G. Neth. Patent 6508284 C.A. 64, 19574b (1966).

then extracted with an 0.1 N aqueous solution of maleic acid. The aqueous phase was made alkaline with a saturated NaHCO$_3$ solution and extracted with ethyl ether. The organic phase was washed with water until neutral, dried over anhydrous Na$_2$SO$_4$, and then distilled. The residue (9 grams) was crystallized from methyl alcohol to yield 9 grams of white crystals having a melting point of 141 to 143° C.

U.V. in ethanol 95%
λmax.=302 mμ; ε=11,780

N-[8-methoxy-dibenzo(b,f)oxepin-10-yl]-N' - methylpiperazine (3.8 grams) as prepared above was dissolved in 15 milliliters of boiling ethanol; then 1.3 grams of maleic acid dissolved in 5 milliliters of boiling ethanol were added. Anhydrous ethyl ether was added to the solution until incipient crystallization (about 150 cc.). After 4 hours at 4° C., the precipitate was filtered off, washed four times with 5 milliliters of anhydrous ethyl ether, dried under high vacuum yielding 3.5 grams of white crystals of the maleate salt with a melting point of 199° C. (decomposition).

U.V. in ethanol 95%
λmax.=300 mμ; ε=12,500

EXAMPLE IV

N-[dibenzo(b,f)oxepin-10-yl]-N'-ethylpiperazine 22 grams (104 mmol) dibenzo(b,f)oxepin-10(11H)-one,
22 grams (192 mmol) N-ethylpiperazine, and
0.5 gram p-toluenesulfonic acid monohydrate were dissolved in 100 milliliters of anhydrous toluene The solution wash refluxed for 66 hours; the formed water was separated off with a Dean-Stark trap. The cooled solution was partitioned between water and toluene. The organic phase was washed with water and toluene. The organic phase was washed with water until neutral; then extracted with 0.1 N aqueous solution of maleic acid. The acid solution was made alkaline with a saturated solution of NaHCO$_3$ and then re-extracted in ethyl ether.

The organic phase was washed with water until neutral, dried over anhydrous Na$_2$SO$_4$, and then distilled. The residue was crystallized from ethyl alcohol. Yield was 7.9 grams with a melting point of 113 to 115° C. (white crystals).

U.V. in ethanol 95%
λmax.=312 mμ; ε=10,450

N - [dibenzo(b,f)oxepin - 10 - yl] - N' - ethylpiperazine (7.54 grams) was dissolved in 35 milliliters of boiling ethanol and 2.85 grams of maleic acid dissolved in 15 milliliters of boiling ethanol were added. The mixture was kept at 4° C. for 4 hours and then filtered. The precipitate was washed four times with 10 milliliters anhydrous ethyl ether and dried under high vacuum. Yield of maleate salt was 8.4 grams with a melting point of 180° C. (decomposition).

U.V. in ethanol 95%
λmax.=308 mμ; ε=10,100

EXAMPLE V

N-[dibenzo(b,f)oxepin-10-yl]-N'-n-propylpiperazine 22 grams (104 mmol) dibenzo(b,f)oxepin-10(11H)-one,
22 grams (172 mmol) N-n-propylpiperazine, and
0.6 gram p-toluenesulfonic acid monohydrate were dissolved in 100 milliliters of anhydrous toluene The solution was refluxed for 90 hours, separating off the water with a Dean-Stark trap. The cooled solution was partitioned between water and toluene. The organic phase was washed with water until neutral; the base was extracted with an 0.1 N maleic acid solution. The aqueous acid solution was made alkaline with a saturated NaHCO$_3$ solution and re-extracted with ether. The organic phase was washed with water until neutral, dried over anhydrous Na$_2$SO$_4$, and the solvent distilled off. The dark residue was crystallized from ethanol yielding 12.5 grams of white crystals with a melting point of 88 to 90° C.

U.V. in ethanol 95%
λmax.=312 mμ; ε=10,650

N - [dibenzo(b,f)oxepin - 10 - yl] - N' - n - propylpiperazine (11.8 grams) was dissolved in 60 milliliters of boiling ethanol and to this was added a solution of 3.81 grams of maleic acid dissolved in 25 milliliters of ethanol. Ethyl ether was added until incipient crystallization, and the mixture was allowed to stand at 4° C. for five hours. The precipitate was filtered off, and washed four times with 10 milliliters of ether. It was dried under high vacuum yielding 11.8 grams of compound with a melting point of 188 to 191° C. (white crystals).

U.V. in ethanol 95%
λmax.=308 mμ; ε=10,100

EXAMPLE VI

N-[dibenzo(b,f)oxepin-10-yl]-N'-n-butylpiperazine 22 grams (104 mmol) dibenzo(b,f)oxepin-10(11H)-one
22 grams (155 mmol) N-n-butylpiperazine, and
0.6 gram p-toluenesulfonic acid monohydrate were dissolved in 100 ml. anhydrous toluene The solution was refluxed for 72 hours, and the formed water separated off with a Dean-Stark trap. The cooled solution was partitioned between water and toluene. The organic phase was washed wtih water until neutral, and then extracted with an 0.1 N aqueous solution of maleic acid. The separated aqueous solution was made alkaline with a saturated solution of NaHCO$_3$ and re-extracted with ethyl ether. The organic phase was washed with water until neutral, dried over anhydrous Na$_2$SO$_4$, and distilled. The brown residue (18 grams) was crystallized from ethyl alcohol and had a melting point of 81 to 83° C. (white crystals).

U.V. in ethanol 95%
λmax.=312 mμ; ε=10,700

N-[dibenzo(b,f)oxepin-10-yl]-N'-n-butylpiperazine (9.66 grams) was dissolved in 45 milliliters of boiling ethanol to which was added 3.35 grams of maleic acid dissolved in 25 milliliters of boiling ethanol. The mixture was kept four hours at 4° C. and then filtered. The precipitate was washed four times with 10 milliliters of anhydrous ethyl ether; then dried under high vacuum yielding 9.4 grams of white crystals with a melting point of 185 to 187° C. (decomposition).

U.V. in ethanol 95%
λmax=308 mμ; ε=10,200

EXAMPLE VII

N-[dibenzo(b,f)oxpin-10-yl]-N'-carbethoxypiperazine 22 grams (104 mol) dibenzo(b,f)oxepin-10(11H)-one,
22 grams (138 mmol) N-carbethoxypiperazine, and
0.6 gram p-toluenesulfonic acid monohydrate are dissolved in 100 ml. anhydrous toluene The solution was refluxed for 74 hours, separating off the water with a Dean-Stark trap. The cooled solution was partitioned between water and toluene. The organic phase was washed with water until neutral, dried over anhydrous Na$_2$SO$_4$, and the solvent distilled off. The residue was crystallized from methanol yielding 16 grams of white crystals with a melting point of 114 to 116° C.

λmax.=309 mμ; ε=10,350
λmax.=309 mμ; ε=10,350

EXAMPLE VIII

N-[dibenzo(b,f)oxepin-10-yl]-N'-phenylpiperazine 22 grams (104 mmol) dibenzo(b,f)oxepin-10(11H)-one,
22 grams (135 mmol) N-phenylpiperazine, and
0.6 gram p-toluenesulfonic acid monohydrate were dissolved in 100 ml. anhydrous toluene The solution was refluxed for 64 hours, separating off the water with a Dean-Stark trap. The cooled solution was partitioned between toluene and water. The organic phase was washed with water until neutral, dried over anhydrous $Na_2SO_4$, and distilled under reduced pressure. The residue was crystallized from ethyl acetate yielding 13 grams of white crystals with a melting point of 148 to 150° C.

U.V. in ethanol 95%
λmax.=308 mμ; ε=10,700

EXAMPLE IX

N-[dibenzo(b,f)oxepin-10-yl]-N'-benzylpiperazine 18 grams dibenzo(b,f)oxepin-10(11H)-one (85.6 mmol),
18 grams N-benzylpiperazine (100.2 mmol), and
0.5 gram p-toluenesulfonic acid monohydrate were dissolved in 100 ml. anhydrous toluene The solution was refluxed for 100 hours, separating off the water with a Dean-Stark trap. The cooled solution was partitioned between water and toluene. The organic layer was washed with water until neutral, dried over anhydrous $Na_2SO_4$, and the solvent evaporated at 15 mm. Hg. The brown residue was crystallized from $CHCl_3$-ethanol obtaining 24.8 grams of white crystals with a melting point of 159 to 160° C.

U.V. in ethanol 95%
λmax.=312 mμ; ε=10,400

EXAMPLE X

N-[dibenzo(b,f)thiepin-10-yl]-N'-methylpiperazine

A mixture of 15 grams (66 mmol) dibenzo(b,f)thiepin-10(11H)-one[3],
30 grams (300 mmol) N-methylpiperazine, and
6 grams (34 mmol) N-methylpiperazine dihydrochloride was slightly refluxed for 48 hours. The excess N-methylpiperazine (about 10 cc.) which contained the water formed during the reaction was distilled off. The cooled residue was partitioned between ethyl ether and a saturated solution of $NaHCO_3$. The organic phase was extracted two times with a saturated solution of $NaHCO_3$ and then with water until neutral. The organic phase was extracted with an 0.1 N aqueous solution of maleic acid. The acid solution was made alkaline with a saturated solution of $NaHCO_3$ and then extracted in ethyl ether. This organic phase was washed with water until neutral, dried over anhydrous $Na_2SO_4$, and then distilled. The residue was crystallized from petroleum ether 60 to 80° C. yielding 10.4 grams of compound with a melting point of 115 to 117° C.

U.V. in ethanol 95%
λmax.=268 mμ; ε=10,900
λmax.=307 mμ; ε=8,150

To 7.9 grams of N-[dibenzo(b,f)thiepin-10-yl]-N'-methylpiperazine dissolved in 25 cc. of boiling ethanol were added 2.97 grams of maleic acid dissolved in 10 cc. of boiling ethanol. It was kept at 4° C. for four hours and then filtered. The precipitate was washed four times with 10 cc. of anhydrous ethyl ether and dried under high vacuum. Yield of compound was 10 grams with a melting point of 213° C. (decomposition).

U.V. in ethanol 95%
λmax.=265 mμ; ε=11,850
λmax.=301 mμ; ε=7,950

---

[3] J. O. Jilek et al., Mh. Chem. 96, 182 (1965).

EXAMPLE XI

N-[dibenzo(b,f)thiepin-10-yl]-N'-n-propylpiperazine

A mixture of 22 grams (97.2 mmol) dibenzo(b,f)thiepin-10(11H)-one,
34 grams (245 mmol) N-n-propylpiperazine, and
16 grams (79.5 mmol) N-n-propylpiperazine dihydrochloride was slightly refluxed for 64 hours. The excess N-n-propylpiperazine (about 15 cc.) which contained water formed during the reaction was distilled off. The cooled residue was partitioned between ethyl ether and a saturated solution of $NaHCO_3$. The organic phase was washed two times with a saturated solution of $NaHCO_3$ and then with water until neutral. It was then extracted with an 0.1 N aqueous solution of maleic acid. The acid solution was made alkaline with $NaHCO_3$ (saturated solution) and extracted in ethyl ether. The organic phase was washed with water until neutral, dried over anhydrous $Na_2SO_4$, and distilled. The oily residue was chromatographed over neutral, activated $Al_2O_3$ (Activity Brockman I). The petroleum ether (boiling point 40 to 70° C.)-benzene (1:1) eluate was crystallized from petroleum ether (boiling point 40 to 70° C.) yielding 9.0 grams of compound in the form of white crystals with a melting point of 80 to 82° C.

U.V. in ethanol 95%
λmax.=268; ε=10,400
λmax.=308 mμ; ε=308 mμ; ε=8,000

To 8.71 grams of the N-[dibenzo(b,f)thiepin-10-yl]-N'-n-propylpiperazine, prepared as described above, dissolved in 40 cc. of boiling ethanol were added 3.00 grams of maleic acid dissolved in 10 cc. of boiling ethanol. The formed salt was allowed to crystallize and was then filtered off. The precipitate was washed four times with 10 cc. anhydrous ethyl ether, and then dried. White crystals (8.7 grams) with a melting point of 171 to 173° C. (decomposition) were obtained.

U.V. in ethanol 95%
λmax.=265 mμ; ε=12,400
λmax.=302 mμ; ε=8,300

EXAMPLE XII

N-[dibenzo(b,f)thiepin-10-yl]-N'-iso-propylpiperazine

A mixture of 20 grams (88 mmol) dibenzo(b,f)thiepin-10(11H)-one,
27.7 grams (216 mmol) N-iso-propylpiperazine, and
7 grams (34 mmol) N-iso-propylpiperazine dihydrochloride was kept slightly boiling for 50 hours. The excess N-iso-propylpiperazine (about 10 cc.) which contained water formed during the reaction was distilled off. The cooled residue was partitioned between ethyl ether and a saturated solution of $NaHCO_3$. The organic phase was washed two times with a saturated solution of $NaHCO_3$, and then washed with water until neutral. The organic phase was extracted with an 0.1 N aqueous solution of maleic acid. The acid solution was made alkaline with a saturated solution of $NaHCO_3$ and extracted in ethyl ether. The organic phase was washed with water until neutral, dried over anhydrous $Na_2SO_4$, and distilled. The yield of compound was 3.2 grams with a melting point of 82 to 86° C. It was chromatographed over neutral, activated $Al_2O_3$ (Activity Brockman I); 2.27 grams were eluted with petroleum ether (boiling point 40 to 70° C.)-benzene (1:1) and crystallized from ethyl acetate; melting point was 83 to 85° C. (white crystals).

U.V. in ethanol 95%
λmax.=268 mμ; ε=10,400
λmax.=308 mμ; ε=8,000

To 0.685 gram of N-[dibenzo(b,f)thiepin-10-yl]-N'-iso-propylpiperazine dissolved in 3 cc. boiling ethanol were added 0.236 gram maleic acid dissolved in 1.5 cc. boiling ethanol. The formed salt was allowed to crystallize and was then filtered off. The precipitate was washed four times with 3 cc. anhydrous ethyl ether and dried. It yielded 0.83 gram of compound in the form of white crystals with a melting point of 196 to 199° C.

U.V. in ethanol 95%
$\lambda$max.=265 m$\mu$; $\epsilon$=12,200
$\lambda$max.=303 m$\mu$; $\epsilon$=8,200

EXAMPLE XIII

N-[dibenzo(b,f)thiepin-10-yl-N'-iso-butylpiperazine

A mixture of 20 grams (88 mmol) dibenzo(b,f)thiepin-10(11H)-one,
36 grams (253 mmol) N-iso-butylpiperazine, and
13 grams (60.4 mmol) N-iso-butylpiperazine dihydrochloride was gently boiled for 48 hours. Successively, 10 cc. of N-iso-butylpiperazine which contained water formed during the reaction were distilled off. The cooled residue was partitioned between ethyl ether and a saturated solution of NaHCO$_3$. The organic phase was washed two times with a saturated solution of NaHCO$_3$ in water until neutral and then extracted with an 0.1 N solution of maleic acid. The acid solution was made alkaline with a saturated solution of NaHCO$_3$ and was extracted in ethyl ether. The organic phase was washed with water until neutral, dried over anhydrous Na$_2$SO$_4$, and distilled. The residue was crystallized from ethyl acetate yielding 10.2 grams of compound with a melting point of 94 to 96° C.

U.V. in ethanol 95%
$\lambda$max.=268 m$\mu$; $\epsilon$=10,300
$\lambda$max.=308 m$\mu$; $\epsilon$=8,000

To 9.84 grams of N-[dibenzo(b,f)thiepin-10-yl]-N'-iso-butylpiperazine dissolved in 30 cc. boiling ethanol were added 3.25 grams of maleic acid dissolved in 10 cc. of boiling ethanol. It is kept at 4° C. for four hours and then filtered. The precipitate was washed four times with 10 cc. of anhydrous ethyl ether and dried under high vacuum. Yield of the compound in the form of white crystals was 12 grams with a melting point of 195 to 197° C. (decomposition).

U.V. in ethanol 95%
$\lambda$max.=265 m$\mu$; $\epsilon$=11,650
$\lambda$max.=303 m$\mu$; $\epsilon$=8,000

EXAMPLE XIV

N-[dibenzo(b,f)thiepin-10-yl]-N'-benzylpiperazine

A mixture of 15 grams (66 mmol) dibenzo(b,f)thiepin-10(11H)-one,
49.7 grams (282 mmol) N-benzylpiperazine, and
8.2 grams (33 mmol) N-benzylpiperazine dihydrochloride was slightly refluxed for 48 hours. About 10 cc. of N-benzylpiperazine which contained water formed during the reaction were distilled off. The cooled residue was partitioned between ethyl ether and a saturated solution of NaHCO$_3$ and then washed with water until neutral, dried over anhydrous Na$_2$SO$_4$, and the solvent distilled. The residue was crystallized from ethyl acetate yielding 11.2 grams of compound in the form of white crystals with a melting point of 137 to 139° C.

U.V. in ethanol 95%
$\lambda$max.=267 m$\mu$; $\epsilon$=10,600
$\lambda$max.=305 m$\mu$; $\epsilon$=8,150

EXAMPLE XV

N-[dibenzo(b,f)thiepin-10-yl]-N'-carbethoxypiperazine

A mixture of 22 grams (97.2 mol) dibenzo(b,f)thiepin-10(11H)-one,
29.3 grams (184.3 mmol) N-carbethoxypiperazine, and
9.5 grams (47.4 mmol) N-carbethoxypiperazine hydrochloride was slightly refluxed for 46 hours, allowing the water which was formed during the reaction to distill off, together with a part of N-carbethoxypiperazine. The cooled residue was partitioned between ethyl ether and a saturated solution of NaHCO$_3$. The organic phase was washed until neutral and dried over anhydrous Na$_2$SO$_4$. The solvent was distilled off. The solid residue was crystallized from ethyl acetate with a melting point of 105 to 108° C. The yield was 6.2 grams.

U.V. in ethanol 95%
$\lambda$max.=267 m$\mu$; $\epsilon$=10,500
$\lambda$max.=306 m$\mu$; $\epsilon$=7,900

EXAMPLE XVI

N-[8-methyl-dibenzo(b,f)thiepin-10-yl]-N'-benzylpiperazine

A mixture of 12.4 grams (51 mmol) 8-methyl-dibenzo(b,f)thiepin-10(11H)-one,[4]
30 grams (170 mmol) N-benzylpiperazine, and
7 grams (28 mmol) N-benzylpiperazine dihydrochloride was slightly refluxed for 48 hours. The water formed during the reaction was distilled off, collecting about 5 cc. of distillate. The cooled residue was partitioned between ethyl ether and a saturated solution of NaHCO$_3$. The organic phase was washed two times with a saturated solution of NaHCO$_3$, washed with water until neutral, and then extracted with an 0.1 N aqueous solution of maleic acid. The acid solution was made alkaline with a saturated solution of NaHCO$_3$, and extracted in ethyl acetate. This organic solution was washed with water until neutral, dried over Na$_2$SO$_4$, and then distilled. The oily residue was crystallized from CHCl$_3$-MeOH (1:9) yielding 10.2 grams of the compound in the form of white crystals with a melting point of 128 to 131° C.

U.V. in ethanol 95%
$\lambda$max.=264 m$\mu$; $\epsilon$=11,200
$\lambda$max.=308 m$\mu$; $\epsilon$=8,600

EXAMPLE XVII

N-[5-ethyl-5H-dibenzo(b,f)azepin-10-yl]-N'-methylpiperazine

A mixture of 1 grams (4.2 mmol) N-ethyl-5H-dibenzo(b,f)azepin-10(11H)-one,[5]
2 grams (20 mmol) N-methylpiperazine, and
360 mg. (2.1 mmol) N-methylpiperazine dihydrochloride was mixed and gently refluxed for 55 hours. A few drops of N-methylpiperazine which contain also water formed during the reaction were distilled off. The residue was cooled and partitioned between benzene and a saturated solution of NaHCO$_3$. The organic phase was washed with water until neutral, dried over anhydrous Na$_2$SO$_4$, and the solvent was distilled off under reduced pressure (water jet pump). The solid yellow-brown residue (1.2 grams)

---
[4] J. R. Geigy A.-G. Netherlands Patent 6404862 C.A. 16215a (1965).
[5] J. R. Geigy A.-G. German Patent 1,142,870 C.A. 59, 11454e (1963).

was crystallized from methyl alcohol yielding white crystals with a melting point of 122 to 125° C.

U.V. in ethanol 95%
λmax.=236 mμ; ε=20,900
λmax.=269 mμ; ε=15,300

N-[5-ethyl - 5H - dibenzo(b,f)azepin-10-yl]N'-methylpiperazine (8.7 grams) was dissolved in 30 milliliters of boiling ethanol and added to a solution of 3.16 grams of maleic acid in 15 milliliters of boiling ethanol. Anhydrous ethyl ether is added to the solution until incipient crystallization (about 400 ml.). The solution was allowed to stand for four hours at 4° C., was filtered and washed with anhydrous ether, and dried for 15 hours at 85° C. at 0.01 mm. Hg. The yield was 10.8 grams of white crystals having a melting point fo 213° C. (decomposition).

U.V. in ethanol 95%
λmax.=266 mμ; ε=17,600

EXAMPLE XVIII

N-[5-acetyl-5H-dibenzo(b,f)azepin-10-yl]-N'-methylpiperazine

To a solution of 0.250 gram (7 mmol) potassium in 20 milliliters of anhydrous tertiary butyl alcohol and 40 milliliters of anhydrous ethyl ether were added 2 grams (6 mmol) of N-acetyl-10-bromo-5H-dibenzo(b,f)azepin [6] and 1.2 grams (12 mmol) of N-methylpiperazine. The solution was refluxed under stirring for 15 hours, and then cooled and poured into about 300 milliliters of water and extracted with ethyl ether. The organic phase was washed with water until neutral and extracted with an aqueous solution of 0.1 N maleic acid. The acid solution was made alkaline with a saturated NaHCO₃ solution and extracted with ethyl ether. The organic solution was washed with water until neutral, dried over anhydrous Na₂SO₄, and distilled. The obtained pale yellow crystals were recrystallized from ethyl acetate yielding 0.60 gram of compound with a melting point of 158 to 160° C.

U.V. in ethanol 95%
λmax.=305 mμ; ε=12,305

EXAMPLE XIX

N-[5-acetyl-5H-dibenzo(b,f)azepin-10-yl]-N'-n-propylpiperazine

To a solution of 4.2 grams (107 mmol) of potassium in 160 milliliters of anhydrous tertiary butyl alcohol and 300 milliliters of anhydrous ethyl ether were added 16 grams (50.9 mmol) of N-acetyl - 10 - bromo-5H-dibenzo(b,f)azepin and 10.1 grams (78 mmol) of N-n-propylpiperazine. The solution was refluxed under stirring for 15 hours. The solution was cooled, poured into water, and extracted with ethyl ether. The organic phase was washed with water until neutral and then extracted with an aqueous solution of 0.1 N maleic acid. The separated acid solution was made alkaline with a saturated NaHCO₃ solution and extracted with ethyl ether. The organic phase was washed with water until neutral, dried over anhydrous Na₂SO₄, and then distilled. The pale yellow oily residue was crystallized from ethyl alcohol yielding 7.6 grams of compound with a melting point of 120 to 123° C.

U.V. in ethanol 95%
λmax.=306 mμ; ε=12,500

N-[5-acetyl - 5H - dibenzo(b,f)azepin-10-yl]-N'-n-proplypiperazine (7.42 grams) was dissolved in 40 milliliters of boiling ethanol. A solution of 2.38 grams of maleic acid in 7 milliliters of boiling ethanol was added. After four hours at 4° C., the white crystalline precipitate was filtered off, washed with anhydrous ethyl ether, and dried at 80° C. for ten hours at 0.01 mm. Hg. The yield was 8.5 grams of white crystals with a melting point of 168 to 170° C.

U.V. in ethanol 95%
λmax.=300 mμ; ε=12,650

EXAMPLE XX

N-[5-acetyl-5H-dibenzo(b,f)azepin-10-yl]-N'-benzylpiperazine

To a solution of 4.2 grams (107 mmol) of potassium in 160 milliliters of anhydrous tertiary butyl alcohol and 300 milliliters of anhydrous ethyl ether were added 16 grams (50.9 mmol) of N-acetyl-10-bromo-dibenzo(b,f)azepin and 14 grams (79.4 mmol) of N-benzylpiperazine. The solution was refluxed under stirring for 15 hours, cooled, poured into water and extracted with ether. The organic phase was washed with water until neutral, dried over anhydrous Na₂SO₄, and the solvent distilled off. The pale yellow solid residue (18 grams) was crystallized from ethyl acetate yielding 9.5 grams of white crystals with a melting point of 180 to 182° C.

U.V. in ethanol 95%
λmax.=306 mμ; ε=12,700

EXAMPLE XXI

N-[8-fluoro-dibenzo(b,f)oxepin-10-yl]-N'-methylpiperazine

A solution of 20 grams (87 mmol) 8-fluoro-dibenzo(b,f)oxepin-10-(11H)-one,
25 grams (240 mmol) N-methylpiperazine, and
7 grams p-toluenesulfonic acid monohydrate were dissolved in 150 ml. anhydrous toluene and refluxed for 70 hours, separating the formed water with a Dean-Stark trap. The cooled solution was partitioned between toluene and water. The organic phase was washed with water until neutral and then extracted with an 0.1 N aqueous solution of maleic acid. The aqueous phase was made alkaline with a saturated NaHCO₃ solution and extracted with ethyl ether. The organic phase was washed with water until neutral, dried over anhydrous Na₂SO₄, and distilled. The residue (20 grams) was crystallized from ethyl acetate and had a melting point of 135 to 138° C.

U.V. in ethanol 95%
λmax.=295 mμ; ε=9,150
λmax.=316 mμ; ε=9,200

To 12.32 grams (39.6 mmol) of N-[8-fluoro-dibenzo-(b,f) oxepin-10-yl]-N'-methylpiperazine dissolved in 50 milliliters of boiling ethanol were added 4.6 grams (39.6 mmol) maleic acid dissolved in 15 milliliters of boiling ethanol. It was allowed to stand for four hours at 4° C. The white crystals obtained were filtered off and washed with ethyl ether. Yield was 10.2 grams with a melting point of 172° C. (decomposition).

U.V. in ethanol 95%
λmax.=293 mμ; ε=9,450

EXAMPLE XXII

N-[dibenzo(b,f)thiepin-5,5-dioxide-10-yl]-N'-methylpiperazine

To a solution 7.14 grams (63.6 mmol) potassium tertiary butoxide in 150 milliliters of anhydrous tertiary butyl alcohol and 300 milliliters of anhydrous ethyl ether were added 62 grams (620 mmol) of N-methylpiperazine and 20 grams (62.2 mmol) 10-bromo-dibenzo(b,f)thiepin-5,5-dioxide.[7] The solution was stirred 20 hours. It was poured into water and extracted with ethyl acetate. The organic

---

[6] J. R. Geigy A.-G. British Patent 943,277 C.A. 61, 1815e (1964).

[7] This compound has been prepared following the procedure described by W. Tochtermann, Knut Oppenlander und Michel Nguyen-Duong Hoang: Liebigs Ann. Chem. 701, 117 (1967).

phase was washed with water until neutral, and then extracted with an aqueous solution of 0.1 N maleic acid. The separated acidic solution was made alkaline with a saturated $NaHCO_3$ solution and extracted with ethyl acetate. The organic phase was washed with water until neutral, dried over anhydrous $Na_2SO_4$, and then distilled. The white crystalline residue was crystallized from 1,2-dichloroethane-ethyl acetate yielding 13 grams of compound with a melting point of 193 to 196° C.

U.V. in ethanol 95%
$\lambda max.=227$ m$\mu$; $\epsilon=37,400$
$\lambda max.=322$ m$\mu$; $\epsilon=11.850$

EXAMPLE XXIII

N-[dibenzo(b,f)thiepin-10-yl]-piperazine

A mixture of 5 grams (22.1 mmol) dibenzo(b,f)thiepin-10(11H)-one,
7 grams (81.3 mmol) piperazine, and
2.1 grams p-toluenesulfonic acid monohydrate in 100 ml. anhydrous xylene was slightly refluxed for 28 hours. The solvent was distilled, and the cooled residue was partitioned between ethyl acetate and a saturated solution of $NaHCO_3$. The organic phase was washed with water until neutral, dried over anhydrous $Na_2SO_4$, and then distilled. The oily residue (6 grams) was chromatographed over neutral, activated $Al_2O_3$ (Activity Brockman I). The substance eluted with the benzene-ethyl ether (1:1) mixture (5.7 grams) was crystallized from ethyl ether and had a melting point of 134° C. (decomposition).

U.V. in ethanol 95%
$\lambda max.=267$ m$\mu$; $\epsilon=10,000$
$\lambda max.=307$ m$\mu$; $\epsilon=7,700$

EXAMPLE XXIV

N-[dibenzo(b,f)thiepin-10-yl]-N'-(N-ethyl-acetamide)-piperazine

A mixture of 5.7 grams (18.6 mmol) N-[dibenzo(b,f)thiepin-10-yl]-piperazine,
2.6 grams (21.6 mmol) N-ethyl-2-chloro-acetamide, and
12.3 grams (116 mmol) anhydrous $Na_2CO_3$ in 100 ml. anhydrous benzene was refluxed for 24 hours. The cooled mixture was washed with water until neutral, dried over anhydrous $Na_2SO_4$, and the solvent distilled. The residue (6 grams) was recrystallized from ethanol. It had a melting point of 150 to 152° C.

U.V. in ethanol 95%
$\lambda max.=268$ m$\mu$; $\epsilon=10,300$
$\lambda max.=307$ m$\mu$; $\epsilon=8,000$ The pharmacological activity of the several different compounds described above will be shown in the following tables.

TABLE I

Spontaneous motility (mouse)

Method: Dews
Administration Route: per os
Dose: ⅕ $LD_{50}$

| Compond of: | Percent reduction of passages |
|---|---|
| Example I | —98 |
| Example II | —87 |
| Example III | —99 |
| Example IV | —78 |
| Example V | —100 |
| Example VI | —100 |
| Example VII | —81 |
| Example VIII | —84 |
| Example X | —99 |
| Example XI | —95 |
| Example XIII | —97 |
| Example XVII | —84 |

TABLE II

Typotensive activity (rat)

Administration route: per os
Dose: ⅕ $LD_{50}$

| Compond of: | Percent pressure modification |
|---|---|
| Example I | cat. —40 |
| Example III | —52 |
| Example IV | —21 |
| Example V | —20 |
| Example VI | —27 |
| Example X | —40 |
| Example XI | —14 |
| Example XIII | —29 |
| Example XIX | —16 |

TABLE III

Anti-inflammatory activity (rat)

Method: Carrageenan oedema
Administration route: per os
Dose: ⅕ $LD_{50}$

| Compound of: | Percent reduction of oedema |
|---|---|
| Example II | —62 |
| Example III | —57 |
| Example IV | —59 |
| Example X | —58 |
| Example XI | —73 |
| Example XIII | —66 |
| Example XV | —64 |
| Example XVI | —50 |
| Example XVII | —68 |

TABLE IV

Hypothermia (rat)

Administration route: per os
Dose: ⅕ $LD_{50}$

| Compond of: | Mod. body temp. ° C. after (time) |
|---|---|
| Example II | —1.0 |
| Example IV | —1.5 |
| Example V | 3 hours —2.2 |
| Example VI | 2 hours —1.6 |
| Example VII | —1.5 |
| Example XVI | 3 hours —1.7 |
| Example XVII | 2 hours —1.1 |

TABLE V

Analgesic activity (mouse)

Method: Hot plate
Administration route: per os
Dose: ⅕ $LD_{50}$

| Compound of: | Percent time modification |
|---|---|
| Example II | +320 |
| Example III | +234 |
| Example IV | +297 |
| Example VI | +240 |
| Example VII | +344 |
| Example X | +261 |
| Example XI | +304 |
| Example XIII | +279 |
| Example XV | +328 |
| Example XVI | +317 |
| Example XVII | +383 |

TABLE VI

Myorelaxing activity (mouse)

Administration route: per os
Dose: ⅕ LD$_{50}$

| Compound of: | Percent of fallen animals |
|---|---|
| Example I | 60 |
| Example III | 100 |
| Example IV | 100 |
| Example V | 80 |
| Example VI | 100 |
| Example X | 100 |
| Example XI | 100 |
| Example XIII | 100 |
| Example XVII | 50 |

What is claimed is:

1. N-[5-ethyl - 5H-dibenzo(b,f)azepin-10-yl]-N'-methylpiperazine.
2. N-[5-acetyl - 5H-dibenzo(b,f)azepin-10-yl]-N'-methylpiperazine.
3. N-[5 - acetyl - 5H - dibenzo(b,f)azepin-10-yl]-N'-n-propylpiperazine.
4. A compound having the formula

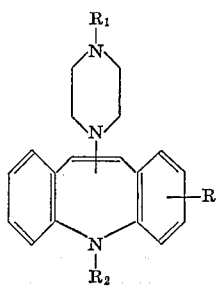

in which R is hydrogen, halogen, lower alkoxy, lower alkyl, amino, monoalkylamino, dialkylamino, trifluoromethyl; $R_1$ is hydrogen, lower alkyl, phenyl, benzyl, benzoyl, carb (lower) alkoxy, carb (lower) alkoxy (lower) alkyl, phenacyl, (lower) alkyl acetamide, di(lower) alkyl acetamide, (lower) alkyl-carboxamide, phenylcarboxamide, halophenylcarboxamide, phenylthiocarboxamide, cyanoethyl, picolyl, or di(lower) alkyl amino (lower) alkyl; and $R_2$ is hydrogen, lower alkyl, or acetyl.

5. N-[5-acetyl - 5H - dibenzo(b,f)azepin-10-yl]-N'-benzylpiperazine.

References Cited

UNITED STATES PATENTS

| 3,100,207 | 8/1963 | Zirkle | 260—268X |
| 3,133,068 | 5/1964 | Schindler | 260—268 |
| 3,262,934 | 7/1966 | Cusic | 260—268 |
| 3,356,680 | 12/1967 | Schindler et al. | 260—268 |
| 3,359,271 | 12/1967 | Schindler et al. | 260—268 |
| 3,401,165 | 9/1968 | Yowan | 260—270 |
| 3,457,264 | 7/1969 | Viterbo | 260—268 |

DONALD G. DAUS, Primary Examiner

U.S. Cl. X.R.

260—239, 327, 333; 424—250